United States Patent [19]

Gilligan et al.

[11] Patent Number: 4,985,773

[45] Date of Patent: Jan. 15, 1991

[54] APPARATUS AND METHOD FOR INHIBITING BLOOMING IN TELEVISION CAMERAS

[75] Inventors: Lawrence H. Gilligan; Charles B. Ladd, both of Charlottesville, Va.

[73] Assignee: Sperry Marine Inc., Charlottesville, Va.

[21] Appl. No.: 373,116

[22] Filed: Jun. 28, 1989

[51] Int. Cl.$^5$ .............................................. H04N 3/14
[52] U.S. Cl. ................................. 358/211; 358/213.19
[58] Field of Search ................... 358/213.19, 214–216, 358/211

[56] References Cited

U.S. PATENT DOCUMENTS

| | | | |
|---|---|---|---|
| 4,462,047 | 7/1984 | Fujimoto et al. | 358/213.19 |
| 4,500,924 | 2/1985 | Ohta | 358/213.19 |
| 4,626,915 | 12/1986 | Takatsu | 358/213.19 |
| 4,875,101 | 10/1989 | Endo et al. | 358/213.19 |

Primary Examiner—Stephen Brinich
Attorney, Agent, or Firm—Seymour Levine

[57] ABSTRACT

Blooming inhibition in an intensified television camera having an image intensifier is effected by applying periodic electrical pulses to the photocathode of the image intensifier of an amplitude that absorbs into the photocathode of the image intensifier excessive electrons in the photocathode and in a space charge adjacent the photocathode resulting from a bright light point in the scene. The pulses are of such short duration that sensitivity of the camera is not significantly reduced. The periodicity of the pulses is such that a plurality of the pulses are applied during each raster line scan. Alternatively, one pulse may be applied during each raster line retrace.

13 Claims, 2 Drawing Sheets

APPARATUS AND METHOD FOR INHIBITING BLOOMING IN TELEVISION CAMERAS

BACKGROUND OF THE INVENTION

1. Field of the Invention

The invention relates to intensified television cameras, particularly with respect to inhibiting blooming in low-light level television cameras (LLL/TV). Such television cameras include intensified charge coupled device cameras utilized as LLL/TV sensors.

2. Description of the Prior Art

LLL/TV sensors have long been known in the prior art. Such sensors include the photocathode type sensor as well as the charge pattern type sensor. The photocathode type sensor is exemplified by the image intensifier LLL/TV typically utilizing a charge coupled device focal plane array. The charge pattern type sensor is exemplified by the diode array type camera tube.

Generally, LLL/TV sensors inherently suffer from a phenomenon referred to as "blooming". Blooming typically occurs when viewing a dark scene and a very bright light, such as a bright light point, is introduced into the scene. As observed on the monitor, the bright point tends to spread obscuring adjacent image data. The blooming problem occurs at the first sensitive surface of the camera sensor encountered by the entrance light and all LLL/TV sensors traditionally include such a sensitive surface. Blooming is observed whenever the bright point of light significantly exceeds the dynamic range capability of the sensor. Blooming thereby renders the LLL/TV useless for night viewing of such scenes as harbors, where the anchorage is dark but worklights and shore lights are in the scene, and night observation of landing aircraft where the landing lights bloom to obscure the entire aircraft.

The blooming problem has been intractable since the development of LLL/TV. Some camera tubes, such as diode array types, exhibit less blooming than others, but heretofore there has not been any solution that inhibited the blooming phenomenon.

The cause of blooming has generally been assumed to be electron diffusion or charge diffusion. Electron diffusion may occur in photocathode type sensors and charge diffusion may occur in charge pattern type sensors. It is believed that such diffusion may occur in both the substrate of the sensor and in any space charge adjacent the substrate. The prior art has heretofore not developed any effective method to avoid such diffusion. All known prior art techniques are believed to use video gain processing in the circuitry of the camera. None are believed to resolve the problem at its source, i.e., the photocathode. Thus, it is believed that all blooming suppression techniques in the prior art use camera gain as the control parameter and are ineffective since they suppress desired detail along with the bloomed area. No known prior art method attempts to exert control of blooming in less than a full television frame interval (1/30 second), during which interval full diffusion can occur.

SUMMARY OF THE INVENTION

The present invention inhibits the blooming phenomenon by applying a narrow electrical pulse to the substrate with respect to which the blooming is occurring of such a polarity as to reabsorb excess diffused electrons or charge into the substrate. The pulse is of such a repetition frequency that excess electrons or charge do not have sufficient time to diffuse a significant distance. The pulses are also of such duration and repetition frequency that the effect on camera sensitivity is not significant.

With respect to an intensified LLL/TV utilizing an image intensifier, a large amplitude positive pulse is applied to the photocathode of the image intensifier to remove or re-absorb the excess diffused electrons in and near the photocathode. The amplitude of the applied pulse is at the "off" potential of the image intensifier.

DESCRIPTION OF THE PREFERRED EMBODIMENT

Figure 1:
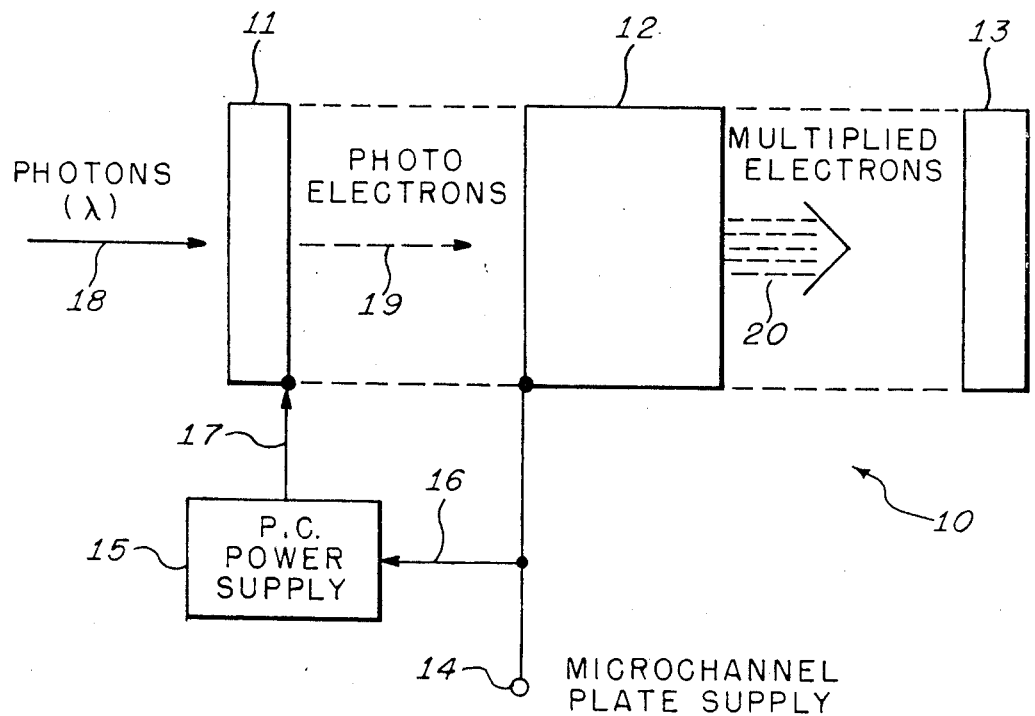
FIG. 1 is a schematic diagram of an image intensifier having a photocathode (PC) power supply operative in accordance with the present invention.

Referring to FIG. 1, a second generation microchannel plate image intensifier 10 of the type utilized in intensified charge coupled device cameras is depicted. Such a camera is described in U.S. patent applications Ser. No. 259,829, filed Oct. 19, 1988, entitled "Automatic Brightness Control for Image Intensifiers" by L. H. Gilligan and D. W. Gerdt; Ser. 288,549, filed Dec. 22, 1988, entitled "Atmospheric Obscurant Penetration Target Observation System with Range Gating" by L. H. Gilligan and D. W. Gerdt; and Ser. 298,456, filed Jan. 18,1989, entitled "Television Camera Apparatus Using Gradient Index Rod Lens", by L. H. Gilligan. Said Ser. 258,829; Ser. 288,549 and 298,456 are assigned to the assignee of the present invention. The image intensifier 10 comprises a photocathode (PC) 11, a microchannel plate 12 and an anode 13. The microchannel plate 12 receives an appropriate microchannel plate potential at a terminal 14 from a microchannel plate power supply (not shown). The photocathode 11 is controlled by a PC power supply 15 referenced to the microchannel plate potential via a line 16. Typically, the microchannel plate potential applied to the terminal 14 is $-800$ V with respect to the microchannel plate output which is typically at ground potential. The PC power supply 15 provides potentials, in accordance with the invention, to the photocathode 11 via a line 17. A power supply such as that described in U.S. patent application Ser. No. 338,805, filed Apr. 14, 1989, entitled "Circuit for Gating an Image Intensifier" by C. B. Cantrell and L. H. Gilligan may be utilized to implement the PC power supply 15. Said Ser. 338,805 is assigned to the assignee of the present invention.

An arriving photon, denoted by an arrow 18, impinging on the photocathode 11 generates a photoelectron by releasing the photon energy in the substrate of the photocathode 11. The photoelectrons are schematically represented by an arrow 19. If the photocathode 11 is polarized negative with respect to the microchannel plate 12, the photoelectrons 19 are released from the substrate of the photocathode 11 and are accelerated by the electric field to the microchannel plate 12. The microchannel plate 12 performs the function of an electron multiplier thereby providing the gain of the image intensifier. If the photocathode 11 is polarized positive with respect to the microchannel plate 12, the photoelectrons 19 are re-absorbed in the substrate of the photocathode 11. A potential (not shown) is applied to the anode 13 to attract the multiplied electrons 20 from the microchannel plate 12 to form an image on the anode phosphor.

Figure 2:
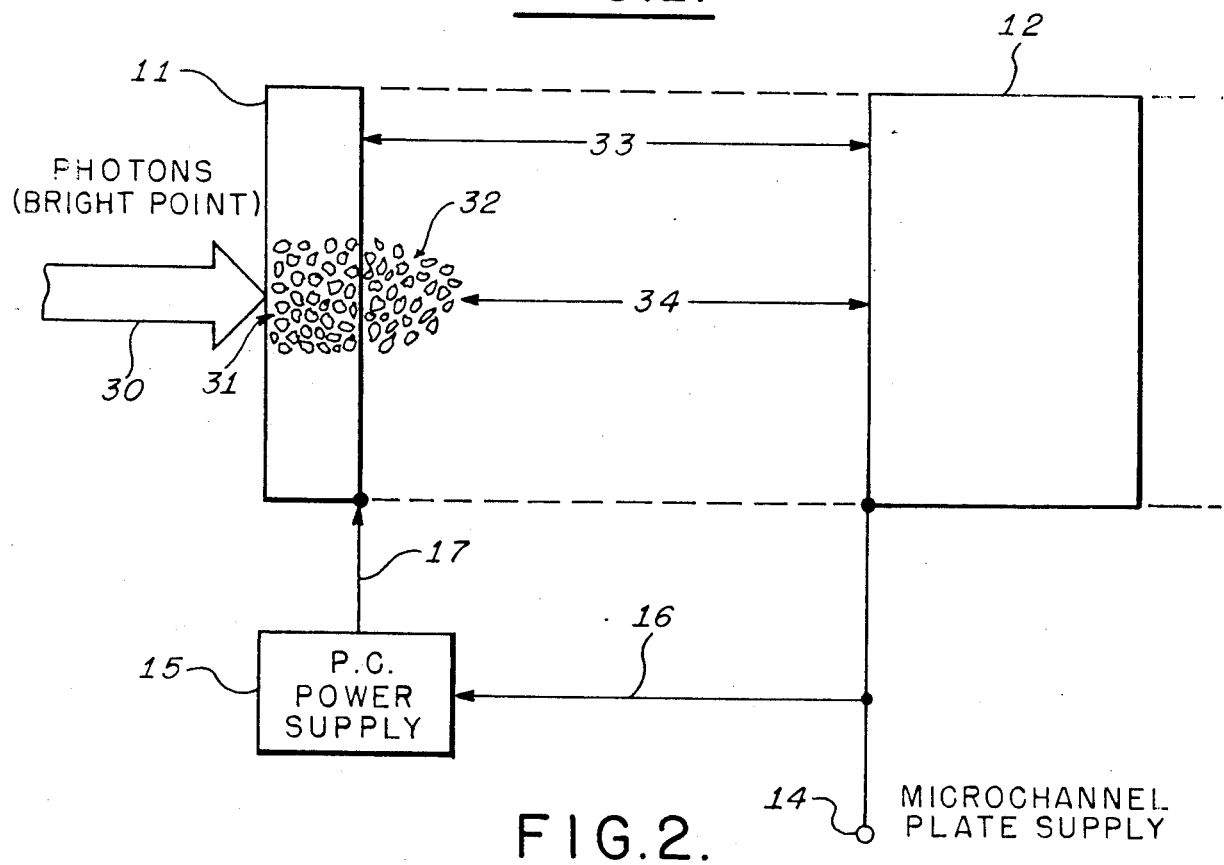
FIG. 2 is a portion of FIG. 1 illustrating the blooming phenomenon resulting from excess diffused electrons in the photocathode and/or in a space charge adjacent the photocathode caused by impinging photons of a bright light point.

Referring to FIG. 2, in which like reference numerals indicate like elements with respect to FIG. 1, the photocathode and microchannel plate portion of the image intensifier 10 is illustrated. Photons of a bright light point are depicted at 30 impinging upon a small region of the photocathode 11. If the excessively bright point of light results in an excessive amount of photons in one small region, then the photocathode 11 becomes saturated with photoelectrons as indicated at 31. A space charge 32 forms and blooming results. It is believed that the blooming is caused by electron diffusion. Thus, the bright light point 30 causes saturation and such a large number of photoelectrons are emitted from the photocathode 11 that the space charge 32 forms from which electrons are drawn to the microchannel plate 12. The space charge 32 causes newly generated photoelectrons in the photocathode 11 to be retained in the substrate, as indicated at 31, where such photoelectrons diffuse to less negative regions of the photocathode 11 resulting in blooming. The blooming phenomenon is also believed to result from diffusion of electrons from the space charge 32. Additionally, the effective distance from the electron source to the microchannel plate 12 is shortened because of the space charge 32 so that less acceleration occurs resulting in a decrease in the resolution of the bright light point. The normal distance for acceleration of the electrons is denoted at 33 and the shortened distance is denoted at 34.

In the preferred embodiment of the invention described herein, the invention reduces or eliminates diffused electrons 31 and 32 in and near the photocathode 11 of an intensified LLL/TV camera of, for example, the charge coupled device focal plane array sensor type. In the preferred embodiment, a large positive pulse is applied to the photocathode 11 of the image intensifier 10 utilized, for example, as the sensor in an intensified charge coupled device camera, in order to remove or re-absorb the excess electrons. The pulse is applied at intervals with a periodicity less than the time required for electrons to diffuse more than a significant number of picture elements (pixels). A pulse of very short duration is utilized and therefore the impact thereof on sensor duty factor is not objectionable. Since the sensitivity of the sensor is a function of the sensor duty factor, the sensitivity of the device is not severely impacted by utilization of the present invention. The repetition rate of the pulse may be such that electrons cannot diffuse more than several pixels. Additionally, the periodicity of the applied pulses may be selected to coincide with the horizontal line sychronization, for reasons to be discussed.

The invention is predicated on the assumption that electron diffusion occurs relatively slowly compared to the generation of photoelectrons and may be rendered negligible by frequent pulse cancellation of the excess electrons. Specifically, the invention is predicated on several theoretical assumptions. The first assumption is that the blooming is caused by electron diffusion in or near the photocathode 11 of the image intensifier 10. The second assumption is that the diffusion process occurs significantly more slowly than the photoelectron generation process and that the electron diffusion may be cancelled by reversing the polarity of the photocathode 11 at intervals which permit utilization of the photocathode 11 at a significant percentage of the photocathode sensitivity based on duty factor operation. Such duty factor operation is described in said U.S. patent application Ser. No. 259,829. Use of the present invention reduces the sensitivity of the photocathode 11 by less than 10%. Although it is not certain that the hypotheses on which the present invention is predicated are correct, the invention functions as if the hypotheses are correct. The present invention is therefore described herein as if the two assumptions are factual.

Therefore, in accordance with the present invention, a positive pulse from a low impedance source is periodically applied to the photocathode 11. The positive pulse causes re-absorption of the electrons in the space charge 32 and discharges the photocathode 11 material itself so that no excess electrons are free to diffuse. The photocathode 11 rapidly assumes a uniform positive charge, since the photocathode is comprised of electrically conductive material.

Figure 3:
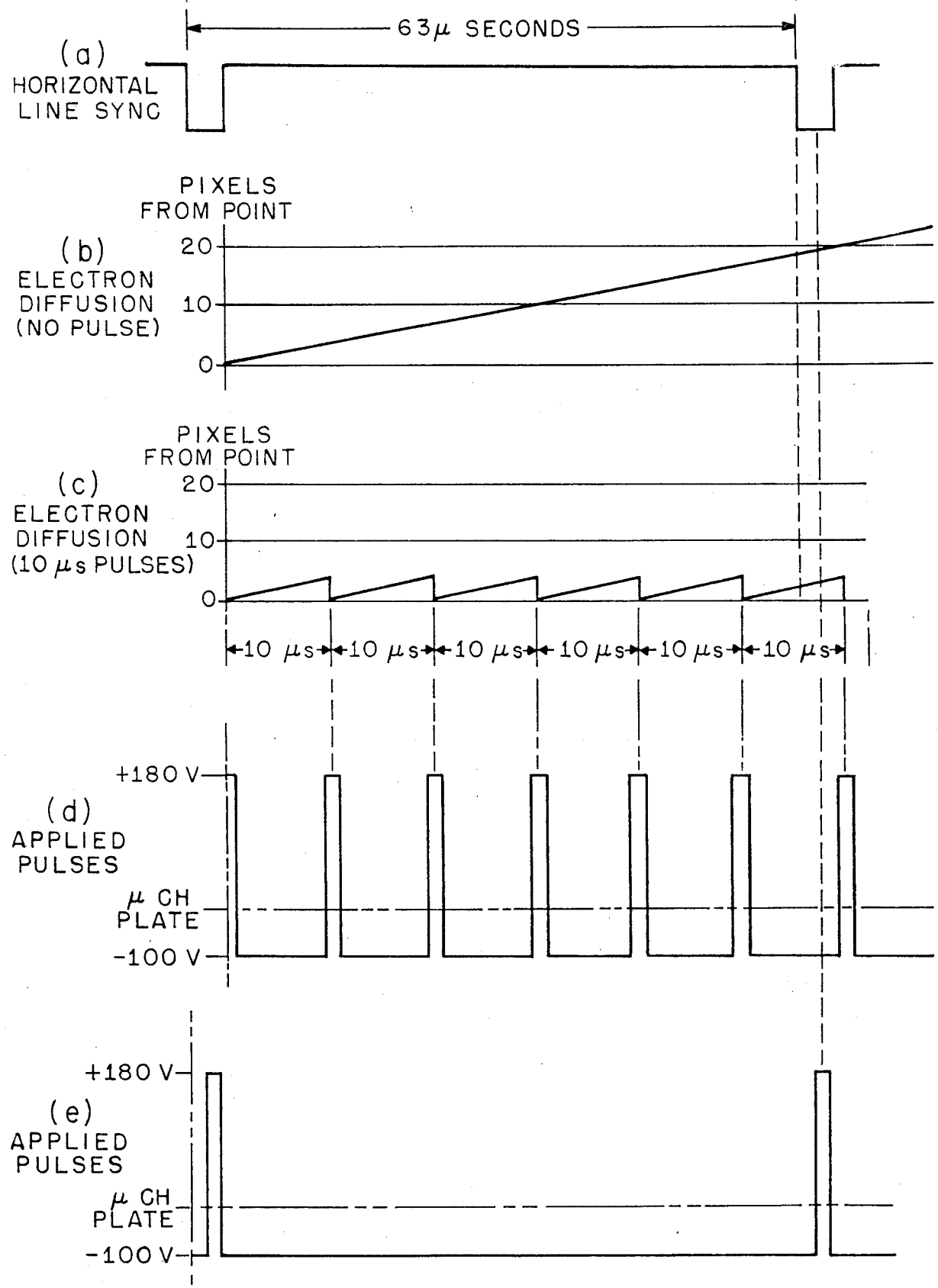
FIG. 3 is a timing diagram useful in explaining the operation of the present invention.

Referring to FIG. 3, a timing diagram of the pulse waveforms utilized to reduce blooming illustrated relative to the standard television line synchronization is depicted. FIG. 3A shows a standard TV line 63 microseconds in duration. FIG. 3B depicts the approximate electron diffusion velocity measured in terms of picture elements over a horizontal TV line scan. FIG. 3C illustrates the result on the diffusion of the electrons of applying the pulse waveform of FIG. 3D in accordance with the invention. The pulse waveform of FIG. 3D results in reabsorption of the excess electrons every ten microsconds. A blooming effect of approximately three pixels is indicated in FIG. 3C. FIG. 3E illustrates a TV line by TV line pulse repetition rate synchronized with the horizontal line sync pulses of FIG. 3A resulting in a blooming effect of approximately eighteen pixels as indicated in FIG. 3B.

In a practical embodiment of the invention, it was determined that, for an 18 millimeter diameter image intensifier, the rate of electron diffusion is approximately three picture elements in 10 microseconds. If the definition of a picture element is 10 micrometers with respect to a charge coupled focal plane array device, the diffusion velocity is approximately one meter per second. Such a diffusion velocity is expected for the space charge 32. Since a bloom of three picture elements is not considered objectionable to an observer, application of a positive pulse once every 10 microseconds, as illustrated in FIG. 3D achieves the desired result of eliminating objectionable blooming. As indicated in FIG. 3D, the pulse amplitudes utilized in the preferred embodiment of the invention are −100 volts and +180 volts with respect to the microchannel plate 12. The −100 volt amplitude is the "on" potential for the image intensifier 10 and the +180 volt level is the "off" potential thereof. Thus, the pulse utilized to re-absorb excess photo electrons from the space charge 32 and to uniformly distribute the excess electrons throughout the photocathode 11 is +180 volts. It is appreciated that this pulse amplitude will vary in accordance with image intensifier type.

If the image intensifier 10 is turned off for a significant time interval, the gain thereof (in a duty cycle configuration) is reduced. Thus, it is desirable to completely discharge the photocathode 11 in a very short time interval in achieving the desired blooming inhibition. The pulse specification utilized in the preferred embodiment of the invention is a pulse width of 100 nanoseconds with a rise time of 5 nanoseconds and a fall time of 25 nanoseconds. The photocathode 11 appears as a capacitance of approximately 25 picofarads which must be charged from the "on" potential of −100 volts to the "off" potential of +180 volts.

The application of a pulse every ten microseconds results in an appearance of interference on the monitor image, in the form of 1-pixel white dots. This occurs because of pulse generator Radio Frequency Interference (RFI), not because of photocathode behavior. The principle of the invention may also be applied by pulsing the photocathode 11 once per TV line, during retrace, which avoids the interference. FIG. 3E illustrates this waveform. If the waveform of FIG. 3E is utilized, the blooming expands to eighteen picture elements as illustrated in FIG. 3B. Thus, the present invention may either eliminate blooming with the potential ancillary effect of visible interference or may reduce blooming with no visible interference. In either case, the principle of the invention is the reduction or elimination of blooming by periodically discharging the space charge in a saturated region of the photocathode 11.

Although the present invention was described primarily in terms of an image intensified television sensor, it is appreciated that the invention comprises apparatus and method for inhibiting blooming in any low-light level television camera. Generally, the invention comprises applying periodic electrical pulses to the input substrate of the camera with respect to which blooming occurs in response to a bright light in the viewed scene which bright light impinges on the substrate. Each pulse is configured to have an amplitude that terminates the blooming and a pulse duration that does not significantly reduce sensitivity of the camera, the pulses having a periodicity that permits the blooming to spread only up to a predetermined extent.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for inhibiting blooming in a low-light level television camera utilized for viewing a scene, comprising
   an input substrate at which blooming occurs in response to a bright light in said scene impinging on said substrate, and
   means for applying periodic electrical pulses to said substrate,
   each said pulse having an amplitude that terminates said blooming and a pulse duration that does not significantly reduce sensitivity of said camera, said pulses having a periodicity that permits said blooming to spread only up to a predetermined extent,
   said low-light level television camera comprising an intensified television camera including an image intensifier, said image intensifier having an input photocathode, said input substrate comprising said input photocathode.

2. The apparatus of claim 1 wherein said photocathode has an on potential and an off potential and said amplitude of said pulse comprises said off potential.

3. The apparatus of claim 2 wherein said television camera has a raster associated therewith, said raster comprising raster lines with raster line retrace therebetween each said raster line having a raster line duration associated therewith.

4. The apparatus of claim 3 wherein said periodicity is such that a plurality of said pulses occur during said raster line duration.

5. The apparatus of claim 3 wherein said periodicity is such that one said pulse occurs during said raster line retrace.

6. The apparatus of claim 2 wherein said image intensifier has a microchannel plate, said microchannel plate is at a predetermined potential and each said pulse is referenced to said microchannel plate potential, each said pulse having a minimum amplitude of −100 volts with respect to said microchannel plate potential, a maximum amplitude of +180 volts with respect to said microchannel plate potential and a duration of 100 nanoseconds.

7. The apparatus of claim 4 wherein said periodicity comprises one said pulse each 10 microseconds.

8. The apparatus of claim 2 wherein said blooming results from diffusion of excess photoelectrons in said photocathode resulting from said bright light and a space charge of excess photoelectrons resulting from said bright light, said space charge being adjacent said photocathode.

9. The apparatus of claim 8 wherein said amplitude of said electrical pulses is such that said excess photoelectrons in said photocathode and in said space charge are absorbed into said photocathode upon application of each said pulse.

10. A method for inhibiting blooming in a low-light level television camera utilized for viewing a scene, said camera having an input substrate at which blooming occurs in response to a bright light in said scene impinging on said substrate, comprising
    applying periodic electrical pulses to said substrate, each said pulse having an amplitude that terminates said blooming and a pulse duration that does not significantly reduce sensitivity of said camera, said pulses having a periodicity that permits said blooming to spread only up to a predetermined extent,
    said low-light level television camera comprising and intensified television camera having an image intensifier with a photocathode, said input substrate comprising said photocathode, said television camera having a raster associated therewith, said raster comprising raster lines with raster line retrace therebetween.

11. The method of claim 10 wherein said applying step comprises applying said periodic electrical pulses with a periodicity such that a plurality of said pulses are applied to said photocathode during the duration of a raster line.

12. The method of claim 10 wherein said applying step comprises applying said periodic electrical pulses with a periodicity such that one said pulse occurs during said raster line retrace.

13. The method of claim 10 wherein said blooming results from diffusion of excess photoelectrons in said photocathode resulting from said bright light and diffusion of excess photoelectrons in a space charge adjacent said photocathode resulting from said bright light,
    said applying step comprises applying said periodic electrical pulses of such amplitude so as to absorb said excess photoelectrons in said photocathode and in said space charge into said photocathode upon application of each said pulse.

* * * * *